(12) United States Patent
Holzmann (10) Patent No.: US 11,525,882 B2
(45) Date of Patent: Dec. 13, 2022

(54) ESTABLISHING A DIRECT COMMUNICATION LINK WITH ANOTHER VEHICLE IN THE VICINITY OF A MOTOR VEHICLE

(71) Applicant: AUDI AG, Ingolstadt (DE)

(72) Inventor: Manfred Holzmann, Greding (DE)

(73) Assignee: AUDI AG, Ingolstadt (DE)

(*) Notice: Subject to any disclaimer, the term of this patent is extended or adjusted under 35 U.S.C. 154(b) by 859 days.

(21) Appl. No.: 16/467,836

(22) PCT Filed: Nov. 23, 2017

(86) PCT No.: PCT/EP2017/080211
§ 371 (c)(1),
(2) Date: Jun. 7, 2019

(87) PCT Pub. No.: WO2018/114208
PCT Pub. Date: Jun. 28, 2018

(65) Prior Publication Data
US 2021/0311159 A1  Oct. 7, 2021

(30) Foreign Application Priority Data
Dec. 21, 2016 (DE) ................... 10 2016 225 746.3

(51) Int. Cl.
*H04L 12/26* (2006.01)
*G01S 5/02* (2010.01)
(Continued)

(52) U.S. Cl.
CPC .......... *G01S 5/0289* (2013.01); *G01S 5/0072* (2013.01); *G06V 20/56* (2022.01); *H04L 67/12* (2013.01); *B60K 35/00* (2013.01); *B60K 2370/31* (2019.05)

(58) Field of Classification Search
None
See application file for complete search history.

(56) References Cited

U.S. PATENT DOCUMENTS

2012/0038489 A1  2/2012  Goldshmidt
2013/0086164 A1  4/2013  Wheeler et al.
(Continued)

FOREIGN PATENT DOCUMENTS

CN    201893808 U    7/2011
CN    104137164 A    11/2014
(Continued)

OTHER PUBLICATIONS

German Office Action dated Jun. 28, 2017 from German Patent Application No. 10 2016 225 746.3, 10 pages.
(Continued)

*Primary Examiner* — Zewdu A Beyen
(74) *Attorney, Agent, or Firm* — Staas & Halsey LLP (57) ABSTRACT

A communication link is established from a motor vehicle to an other vehicle in the vicinity of the motor vehicle by receiving configuration data from the other vehicle, and determining a relative position of the other vehicle relative to the motor vehicle. A virtual display, which indicates the other vehicle as a possible communication partner, is provided for a user of the motor vehicle by at least partially using the relative position of the other vehicle and the configuration data. A communication command is received from the user, by which the other vehicle is selected as the communication partner. A direct communication link is then established with the other vehicle having been selected as the communication partner.

18 Claims, 2 Drawing Sheets

(51) Int. Cl.
  *G01S 5/00* (2006.01)
  *H04L 67/12* (2022.01)
  *G06V 20/56* (2022.01)
  *B60K 35/00* (2006.01)

(56) References Cited

U.S. PATENT DOCUMENTS

2016/0362001 A1  12/2016  Jung et al.
2017/0178498 A1* 6/2017  Mcerlean .............. G08G 1/163

FOREIGN PATENT DOCUMENTS

| CN | 104185149 A | 12/2014 |
|---|---|---|
| DE | 10 2004 056 724 A1 | 5/2006 |
| DE | 10 2006 041 569 A1 | 5/2007 |
| DE | 10 2016 225 746.3 | 12/2016 |
| JP | 2014-35582 | 2/2014 |
| WO | 2016/186039 A1 | 11/2016 |
| WO | PCT/EP2017/080211 | 11/2017 |

OTHER PUBLICATIONS

International Search Report dated Mar. 6, 2018 from International Patent Application No. PCT/EP2017/080211, 2 pages.
Office Action dated Jul. 15, 2020, in Chinese Patent Application No. 201780079112.2, with English summary of Examiner's comments, 10 pages.
Translation of the International Preliminary Report on Patentability dated Jun. 27, 2019 from international Patent Application No. PCT/EP2017/080211, 9 pages.

* cited by examiner

ESTABLISHING A DIRECT COMMUNICATION LINK WITH ANOTHER VEHICLE IN THE VICINITY OF A MOTOR VEHICLE

CROSS REFERENCE TO RELATED APPLICATIONS

This application is a U.S. national stage of International Application No. PCT/EP2017/080211, filed on Nov. 23, 2017. The International Application claims the priority benefit of German Application No. 10 2016 225 746.3 filed on Dec. 21, 2016. Both the International Application and the German Application are incorporated by reference herein in their entirety.

BACKGROUND

Described herein is a method for establishing a communication connection of a motor vehicle with another motor vehicle in the vicinity thereof. In this case, a virtual overview is produced for a user of the motor vehicle, by which the user can select the other motor vehicle as a communication partner. A second aspect concerns a motor vehicle with a communication device for establishing the communication connection.

Mobile telephones are known from the related art for example that can be coupled to a motor vehicle and enable a communication connection via the mobile telephone network. In this case, a communication connection is established between a user of the mobile telephone in the motor vehicle and another user of another telephone. For a purposeful establishment of the communication connection, first an exchange of the respective telephone number is necessary.

Moreover, the related art provides radio devices as communication devices, by which radio messages can be sent from a motor vehicle, usually a truck, which can be received by all other vehicles in the vicinity of the motor vehicle if they include a corresponding communication device. In this case, the establishment of a direct and open communication connection with any other vehicles in the vicinity of the motor vehicle is possible. The purposeful establishment of a communication connection with only one or more selected vehicles is not possible.

In this context, German Patent Application Publication No. 10 2004 056 724 A1 describes a method for transmitting data over a direct communication connection from a motor vehicle and at least one other vehicle. In this case, the communication connection can be encoded using security certificates.

German Patent Application Publication No. 10 2006 041 569 A1 provides a method by which a range of a communication connection between a motor vehicle and another vehicle can be increased compared to a direct communication connection. In this case, an intermediate node receives radio signals of the motor vehicle and the other vehicle and sends them on.

U.S. Patent Application Publication No. 2012/003 84 89 A1 reveals a method that enables for a user a spontaneous call of a nearby motor vehicle without knowing a telephone number or specific contact details based on identification features of the nearby motor vehicle that are visible to the user. For this purpose, the visible identification features are displayed to the user of the motor vehicle.

Japan Patent Application Publication No. 2014 035 582 A concerns a motor vehicle communication device with an information acquisition unit that determines information concerning a communication target, and with a communication target display device that identifies a vehicle as the contactable communication target based on the determined information and displays information that indicates the position of the vehicle. Moreover, the motor vehicle communication device includes a communication connection unit that establishes a communication connection with the selected communication target on selecting the indicated communication target.

SUMMARY

Described herein is a method and apparatus to enable a user of a motor vehicle to establish a communication connection of the motor vehicle to another vehicle in the vicinity of the motor vehicle.

Advantageous embodiments with advantageous developments of the method and the motor vehicle are described with respect to the description and the drawings. Advantageous embodiments of the method and the advantages thereof also apply similarly to the motor vehicle and vice-versa.

Within the scope of the method for establishing a communication connection of a motor vehicle to another vehicle in the vicinity thereof, configuration data are first received from the other vehicle. The other vehicle is another vehicle, in particular another motor vehicle. The configuration data can indicate the readiness of the other vehicle for establishing the communication connection. Alternatively or additionally, the configuration data can contain control data and/or protocol data that determine a standard of the communication connection to be established. The configuration data can be sent by a sending unit of the other vehicle and received by a receiving unit of the motor vehicle. In particular, the configuration data are received by the receiving unit of the motor vehicle directly, i.e. without an intermediate station, from the sending unit of the other vehicle. Directly means in this context in particular without switching, for example without a cellular base station or an intermediate node being involved.

In another operation a relative position of the other vehicle relative to the motor vehicle is determined. The determination of the relative position of the other vehicle can be necessary to link the configuration data with the other vehicle that is visible to a user, in particular a driver, of the motor vehicle. The configuration data can be associated with the other vehicle using the relative position thereof. For this purpose, the other vehicle can be localized by a localization unit of the motor vehicle. For example, the relative position of the other vehicle can be defined by a virtual coordinate system that is oriented towards the motor vehicle. For example, the relative position is defined by a distance between the motor vehicle and the other vehicle and an angle between a longitudinal axis of the motor vehicle and a straight line connecting the other vehicle and the motor vehicle.

During the determination of the relative position of the other vehicle, an image of the other vehicle (30) is recognized using the configuration data either in environment data acquired by an in particular image generating environment sensor system (20) of the motor vehicle (1) or a respective relative position of a number of other objects (45) in the vicinity (U) of the motor vehicle (1) is determined as potential relative positions of the other vehicle (30) using the environment data and the relative position of the other vehicle (30) is selected from the potential relative positions using a receiving direction from which the configuration data (32) are received and/or the configuration data (32).

Because the communication capability of the other vehicle is known using the configuration data and moreover the relative position is known, the other vehicle can be notified to the user as a possible communication partner. A virtual display is provided for the user of the motor vehicle that indicates the other vehicle as a possible communication partner. The virtual display is at least partly provided using the relative position of the other vehicle and the configuration data of the other vehicle. The virtual display can for example be in the form of a text-based overview or a graphical overview, in particular in the form of a street map, in which for example both the motor vehicle and the other vehicle are represented. The virtual display can be provided to the user by using a display unit, for example a display screen or a display system for projection onto a windscreen and/or side screen of the motor vehicle, also known as a head-up-display, or as spectacles for representing virtual reality. In particular, a communication capability and/or communication readiness of the other vehicle are shown in the virtual display. A particularly advantageous development provides that the virtual display is provided in the form of an expanded reality, also known as an augmented reality. In the context of the expanded reality, the virtual display, in particular a suitable sensor system, can be overlaid on a real image, for example the surroundings and in particular the other vehicle. This is carried out, for example, by using the head-up-display or the spectacles for displaying the virtual reality.

In another operation a communication command is received by the user, wherein the other vehicle is selected as a communication partner by the communication command. In particular, an input device is embodied for sending the communication command. Therefore, the communication command can be received by the input device. By using the input device the user can select the other vehicle as the communication partner. For example, by using the communication command the user can signal his wish to establish the communication connection to the other vehicle. The input device can be provided for gesture recognition by a control element, for example a push button or a rotary press switch, by a touch sensitive display screen or by a sensor system, in particular a camera. In particular, the communication command from the user is received by analyzing an input of the user or a gesture of the user.

In another operation a direct communication connection is established to the communication partner that the user has selected. In particular, the direct communication connection is established by the sending unit and/or receiving unit of the motor vehicle and the sending unit and/or receiving unit of the other vehicle. As already described above, directly means for example without switching, in which no intermediate node and/or no cellular base station is involved. Communication data are for example transmitted directly by the sending unit of the motor vehicle to the receiving unit of the other vehicle or vice-versa. The communication connection is for example established by using the communication unit of the motor vehicle and the communication unit of the other vehicle. To establish the communication connection, the communication data can be sent by the motor vehicle to the other vehicle or can be received by the motor vehicle from the other vehicle.

In particular, image data, text messages and/or audio data can be sent and/or received via the communication connection, which means that communication data contain image data, text messages and/or audio data. For example, a voice message or a conversation can be sent and/or received as the audio data. In particular, the conversation can be a conversation, for example, in the manner of a phone call, of the user with another user of the other vehicle. In particular, the communication data, i.e. in particular the image data, the text messages and/or the audio data, are transmitted between the other vehicle and the motor vehicle via the communication connection.

In a development it is provided that the relative position of the other vehicle is determined by trilateration and/or triangulation using a radio signal to receive the configuration data. In particular, the relative position of the other vehicle is determined at least partly using the radio signal. Because the radio signal is received exactly from the direction in which the other vehicle is disposed, the relative position of the other vehicle can be determined particularly advantageously in this way.

The relative position of the other vehicle is in particular determined by receiving the radio signal by using the receiving unit, for example an antenna, and at least one other receiving unit and by analyzing a respective amplitude and/or phase and/or transition time of the radio signal to the receiving unit and the at least one other receiving unit. The receiving unit and the at least one other receiving unit are for example disposed on the motor vehicle spatially separated from each other. For example, the receiving unit is disposed in a rear region of the motor vehicle and the at least one other receiving unit is disposed in a front region of the motor vehicle. In one development, two other receiving units are disposed in a front region of the motor vehicle on a left and right side of the motor vehicle when viewed in the direction of travel. By analyzing the respective amplitude and/or phase and/or transition time of the radio signal to the receiving units, the relative position of the other vehicle can be determined. For example, by analyzing the respective amplitude a respective distance of the other vehicle from the respective receiving unit can be determined. The relative positions of the other vehicle can result therefrom by trilateration. Alternatively or additionally, a difference of the respective amplitudes can be analyzed as an amplitude difference. Alternatively or additionally, a transition time difference of the radio signal between the receiving units can be determined. The transition time difference is in particular the magnitude of the difference of a time at which the radio signal is detected at the receiving unit and a time at which the radio signal is detected at the at least one other receiving unit. Alternatively or additionally, a phase, in particular a phase position, of the radio signal at the receiving unit and at least one other receiving unit can be analyzed or compared. As a result, a further specification of the relative position of the other vehicle can be determined.

In another embodiment it is provided that the respective configuration data contain state data and/or the vehicle data that characterize the other vehicle. The state data can for example describe a position of the other vehicle, for example a currently travelled traffic lane, coordinates of an absolute position of the other vehicle or a distance to a land mark, for example a traffic sign or an exit, a speed of the other vehicle or a planned route of the other vehicle. The vehicle data can for example describe an external appearance of the other vehicle, in particular a color and a body shape. In particular, the state data and/or the vehicle data for the other motor vehicle can be provided to the user by using the virtual display. The user can then select the other vehicle as a communication partner using the state data and/or vehicle data.

In one embodiment it is provided that an image of the other vehicle is recognized in the environment data, which are acquired by an in particular image-generating environment sensor system of the motor vehicle, using the configuration data. The environment sensor system can for example include one or more cameras, at least one radar sensor, at least one lidar sensor and/or at least one ultrasonic sensor. A sensor system that acquires an image and/or a picture of the surroundings of the motor vehicle as part of the environment data or as the environment data can be referred to as the image-generating environment sensor system. The picture of the other vehicle is for example recognized using the state data and/or the vehicle data, which are part of the configuration data. For example, the vehicle data contain information about the color and the body shape of the other vehicle. In this example, the body shape and the color of the other vehicle can be recognized in the environment data, for example in a camera image. In general, a picture of the other vehicle can be recognized in the environment data using the configuration data. In this way, the configuration data are linked to the surroundings of the motor vehicle. In particular, the configuration data can be associated with the motor vehicle that can be visually recognized by the user.

The relative position of the other vehicle is for example determined with reference to the state data and/or the vehicle data using the environment data. For example, the relative position of the other vehicle is determined using the environment data if the picture of the other vehicle is determined in the environment data. In other words, the relative position of the other vehicle can be determined using the environment data if the configuration data are linked to the environment data.

The accuracy of the determination of the relative position by triangulation and/or trilateration can be increased by determining the relative position of other objects by using the environment sensor system and associating the radio signal for transmitting the configuration data with one of the other objects. In one embodiment it is provided that a respective relative position of a number of other objects in the vicinity of the motor vehicle are determined as potential relative positions of the other vehicle and the relative position of the other vehicle is selected from the potential relative positions using a direction of reception from which the configuration data are received, and/or the configuration data, in particular the state data and/or vehicle data. For example, the number of other objects in the vicinity of the motor vehicle includes the other vehicle and further vehicles. In particular, the respective relative positions are determined using the environment data. Multiple potential relative positions for the other vehicle result from this. One of the potential relative positions can be selected as the relative position of the other vehicle using the configuration data or using the reception direction from which the configuration data are received, in particular the reception direction of the radio signal for transmitting the configuration data. In particular, one of the potential relative positions is associated with the other vehicle as the relative position of the other vehicle. The association can be carried out for example by trilateration and/or triangulation using the radio signal for receiving the configuration data. Alternatively or additionally, the association can be carried out with reference to the state data and/or the vehicle data. In one example, the respective relative position of another object of this type to which the appearance transmitted using the vehicle data applies can be selected as the relative position of the other vehicle.

Of course, the method can also be used for a plurality of other vehicles. Advantageously, in addition to the configuration data from the other vehicle respective configuration data are received from the further other vehicles and a respective relative position is determined for the further other vehicles. Further vehicles in the vicinity of the motor vehicle are referred to as further other vehicles, in particular further vehicles that are different from the previously described other vehicle. The further other vehicles and the other vehicle are referred to as the other vehicles below. The virtual display can represent the other vehicle and the further other vehicles. The other vehicle and/or one or more of the further other vehicles can be selected as communication partners by the communication command. In particular, a communication command is received, by which the other vehicle and/or one or more of the other vehicles are selected as communication partners. For example, a plurality of the other vehicles are selected by the communication command as the communication partners. As a result, the user can select one or more of the other vehicles as communication partners for the establishment of a communication connection in an environment in which still more other vehicles are located in addition to the other vehicle. If the other vehicle or one of the further other vehicles is selected as the communication partner, then the establishment of the communication connection with the other vehicle or the further other vehicles can be carried out.

In one development it is provided that a conference connection is established with a plurality of communication partners. In particular, if two or more communication partners are selected by the communication command, a conference connection (multicast) can be established. In the event of a conference connection, in particular a direct communication connection is established with each of the communication partners. Furthermore, it can be provided that a direct communication connection is also established among all communication partners. The motor vehicle for example acts as the host of the conference connection, which means that communication data of the respective other communication partners are sent or transmitted to each of the communication partners by the motor vehicle. Alternatively or additionally, a broadcast can be established, which means that a connection is established with all the other vehicles.

A second aspect concerns a motor vehicle with a communication device for establishing a communication connection of the motor vehicle with another vehicle located in the vicinity. The motor vehicle includes a receiving unit for receiving configuration data from the other vehicle and a sending unit for establishing a direct communication connection with a communication partner. The receiving unit and the sending unit can be contained by a sending unit. Moreover, the motor vehicle includes a determination unit for determining a relative position of the other vehicle relative to the motor vehicle. For example, the determination unit is embodied as a computing unit that establishes the determination of the relative position using the configuration data and/or using a radio signal to receive the configuration data.

A display unit is used to provide a virtual display that indicates the other vehicle as a possible communication partner for a user of the motor vehicle. The display unit can be embodied for providing the virtual display at least partly using the determined relative position of the other vehicle and using the received configuration data. An input device is embodied for receiving a communication command from the user, wherein the other vehicle can be selected as the communication partner by the communication command. The display unit and the input device can be embodied together as a touch-sensitive display screen. The motor vehicle is designed to carry out a method according to one of the previously described embodiments. The motor vehicle is in particular implemented as a car, for example as a passenger car.

In addition, the motor vehicle includes an environment sensor system for acquiring environment data. The motor vehicle is designed to recognize a picture of the other vehicle in the environment data using the configuration data or to determine a respective relative position of a number of other objects in the vicinity of the motor vehicle as potential relative positions of the other vehicle using the environment data and the relative position of the other vehicle is selected from the potential relative positions using a receiving direction from which the configuration data are received.

The disclosure also includes developments of the motor vehicle described herein that include features that have already been described in connection with the developments of the method described herein. For this reason, the corresponding developments of the motor vehicle are not described here again.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Reference will now be made in detail to example embodiments which are illustrated in the accompanying drawings.

The exemplary embodiments described below are example embodiments of the disclosure. In the exemplary embodiments the described components of the embodiments are each individual features that are to be considered mutually independent, each of which also develops the disclosure mutually independently and can also be considered as a component of the disclosure individually or in a different combination than the indicated combination. Furthermore, the described embodiments can also be augmented by other features that have already been described.

In the drawings functionally identical elements are each provided with the same reference character.

Figure 1:
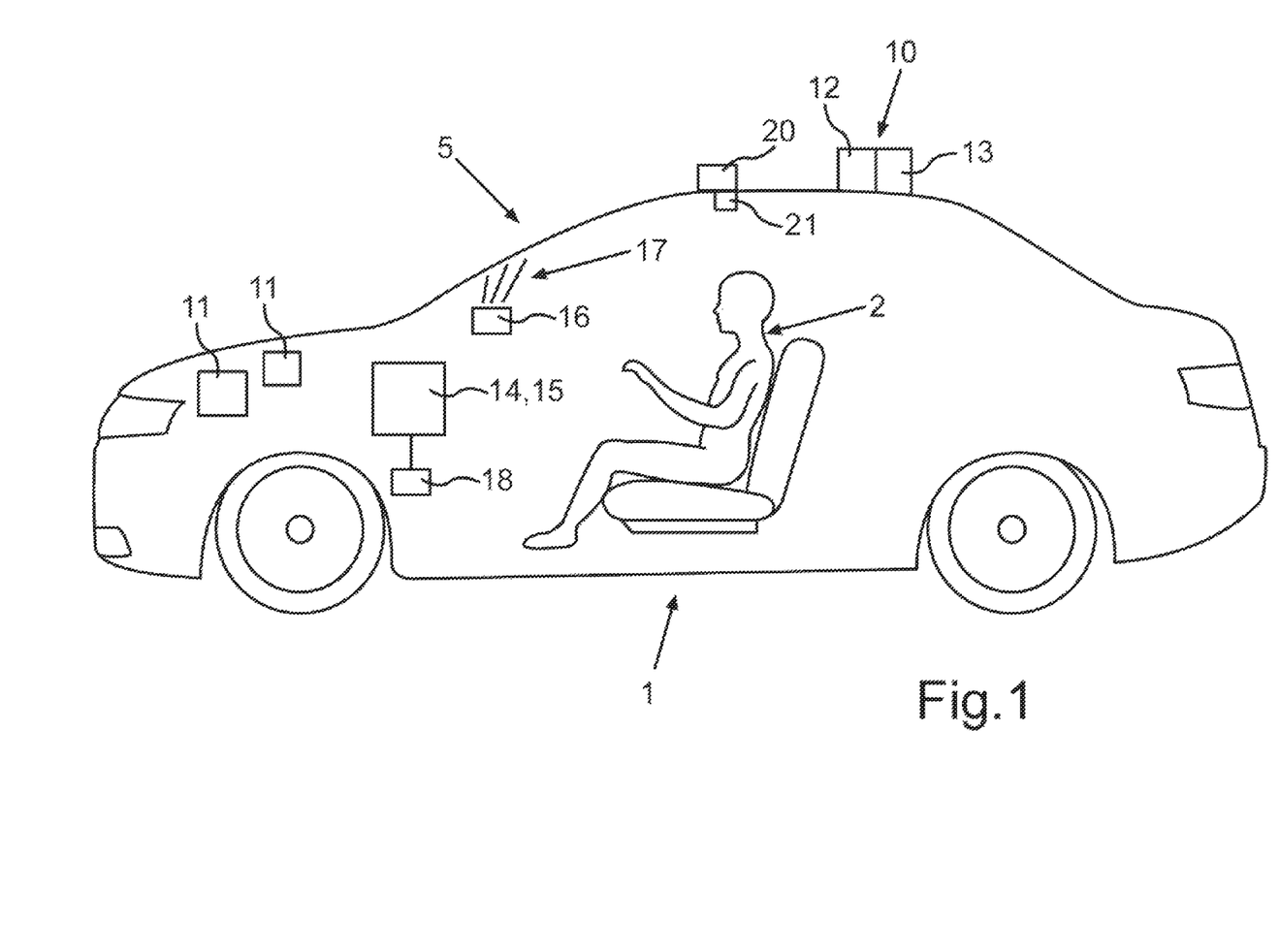
FIG. 1 is a schematic side view of a motor vehicle with a communication device for establishing a communication connection.

FIG. 1 shows a motor vehicle 1 with a communication device 5 for establishing a communication connection 19 of the motor vehicle 1 with another vehicle 30 located in the vicinity. The motor vehicle 1 includes a receiving unit 12 for receiving configuration data 32 from the other vehicle 30. In the example the motor vehicle further includes a sending unit 13 for establishing a direct communication connection 19 with the other vehicle 30 as a communication partner. The motor vehicle includes a determination unit 18 for determining a relative position of the other vehicle 30 relative to the motor vehicle 1. Moreover, the motor vehicle 1 includes a display unit 14 for providing a virtual display 4, in the example a display screen, for example a touch-sensitive display screen, wherein the virtual display 4 indicates the other vehicle 30 as a possible communication partner. In this case, the other vehicle 30 is at least partly indicated as the possible communication partner using the configuration data and the relative position of the other vehicle 30. In particular, the virtual display 4 is provided for a user 2 of the motor vehicle 1. An input device 15 is embodied for receiving a communication command from the user 2. The user 2 can select the other vehicle 30 as the communication partner by using the communication command. The input device 15 and the display unit 14 are implemented as a touch-sensitive display screen, for example. Alternatively or additionally, the motor vehicle 1 can include a projector 16 as the display unit 14. The projector 16 can be embodied for providing the virtual display 4 by using a projection 17 on a vehicle component, in particular a windscreen of the motor vehicle 1. Moreover, the example motor vehicle 1 includes further optional receiving units 11. The receiving unit 12 and the sending unit 13 of the motor vehicle 1 are in the example provided by a communication unit 10, in particular an antenna.

Figure 2:
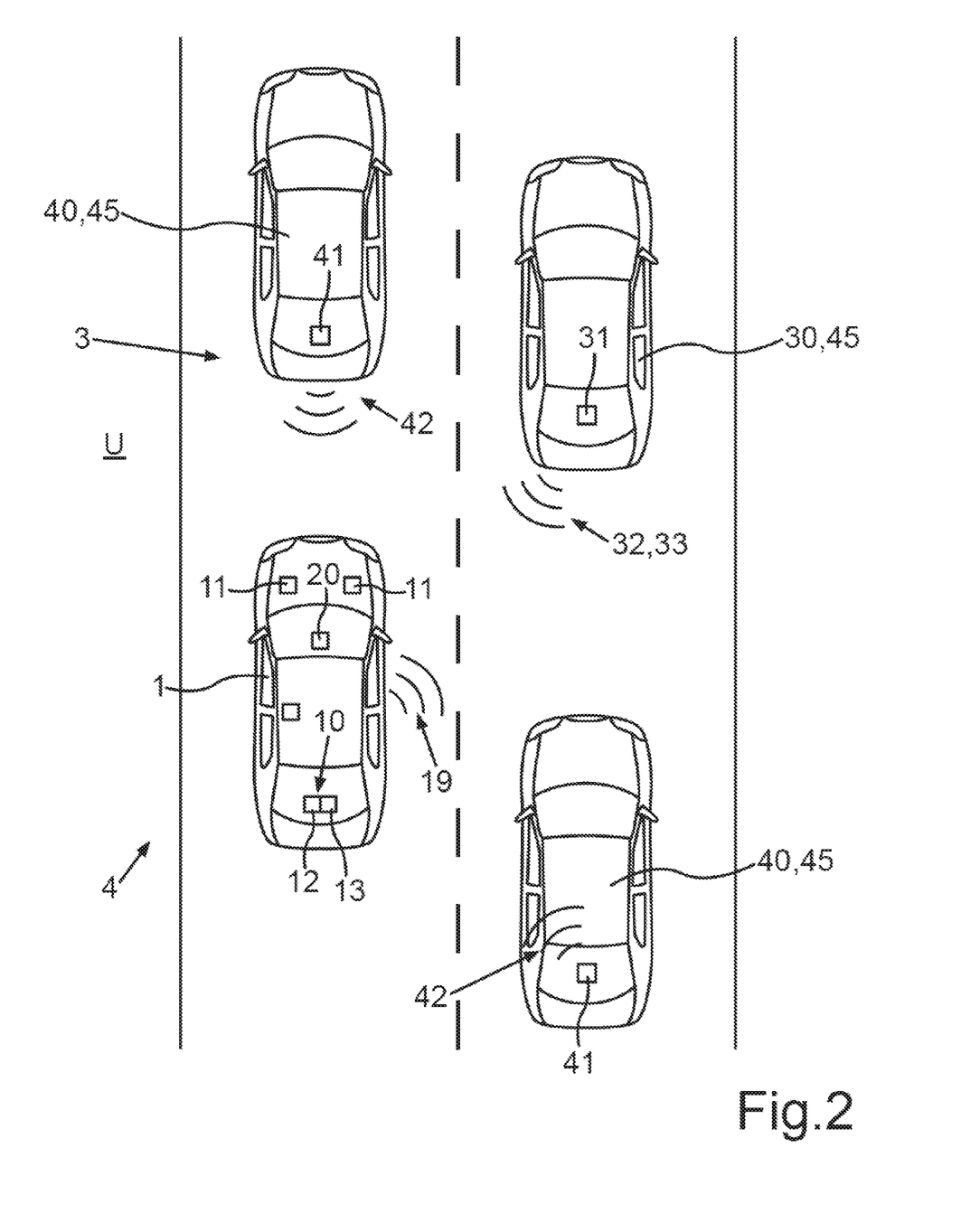
FIG. 2 is a motor vehicle in an environment with another vehicle with which a communication connection is established.

FIG. 2 shows the surroundings of the motor vehicle 1 in a schematic bird's-eye view. At the same time, FIG. 2 is an example of the virtual display 4. The motor vehicle 1 is located on a road 3 and is surrounded by the other vehicle 30 and further other vehicles 40. The other vehicle 30 and the further other vehicles 40 depict other vehicles in the vicinity of the motor vehicle 1 in this context. The receiving unit 12 or the communication unit of the motor vehicle 1 receives configuration data 32 from the other vehicle 30. The configuration data 32 can be transmitted by a communication unit 31 of the other vehicle 30. The receiving unit 12, for example, receives the configuration data 32 directly from the communication unit 31 of the other vehicle 30. The configuration data 32 can notify the readiness of the other vehicle 30 for establishing or receiving a direct communication connection 19. Moreover, the configuration data 32 can include a position of the other vehicle 30 on the road 3 and a direction of motion and a speed of the other vehicle 30 as state data of the vehicle 30. The configuration data 32 may include vehicle data, which for example characterize the appearance of the other vehicle 30. For example, the vehicle data contain information about a body shape and a color of the other vehicle 30. Corresponding configuration data can be transmitted in an optimal way by the motor vehicle 1, in particular the communication unit 10.

A relative position of the other vehicle 30 relative to the motor vehicle 1 can be determined. In the example, the motor vehicle 1 includes other receiving units 11. The other receiving units 11 can be embodied as further communication units that include another sending unit. The configuration data 32 or a radio signal 33 for transmitting the configuration data 32 is/are received by the receiving unit 12 and in other receiving units 11. The configuration data 32 or the radio signal 33 can be received by the receiving unit 12 and the other receiving units 11 at different points in time. Respective transition time differences of the radio signal 33 between the receiving units 11, 12 result from the different points in time. In the example, according to FIG. 2 the radio signal 33 is first successively received by the other receiving units 11 and last by the receiving unit 12. The later that one of the receiving units 11, 12 receives the radio signal 33, the more distant it is from the other vehicle 30 or the communication unit 31 of the other vehicle 30. The position of the other vehicle 30 can be determined therefrom using trilateration or triangulation. Alternatively or additionally, a phase and/or an amplitude of the radio signal 33 can be analyzed. For example, the amplitude of the radio signal 33 is greater, the closer is the respective receiving unit 11, 12 to the other vehicle 30.

Alternatively or additionally, the relative position of the other vehicle 30 can be determined by using an environment sensor system 20 of the motor vehicle 1. The environment sensor system 20 is in particular embodied as a camera, as a radar sensor, as a lidar sensor or as an ultrasonic sensor. The environment sensor system 20 acquires an in particular pictorial image of the surroundings U as environment data. The environment data can be linked to the configuration data 32 and/or to the analysis of the radio signal 33 by triangulation or trilateration. For example, respective relative positions in a number of other objects 45, in the example the other vehicle 30 and the further other vehicles 40, are determined as potential relative positions of the other vehicle 30 using the environment data. Using a receiving direction and/or a distance from which the configuration data 32 or the radio signal 33 is received, one of the potential relative positions can be selected or determined as the relative position of the other vehicle 30. In particular, one of the potential relative positions of the other vehicle 30 is selected by triangulation or trilateration using the radio signal 33.

Alternatively or additionally, the relative position of the other vehicle 30 can be selected from the potential relative positions of the other vehicle 30 using the configuration data, in particular the state data and/or the vehicle data. For example, the respective relative position of such another object 45, which coincides with the state data and/or the vehicle data, is selected as the relative position of the other vehicle 30. For example, the respective relative position of one of the other objects 45 that coincides in color and body shape with the vehicle and body shape described by the vehicle data, is selected as the relative position of the other vehicle 30. Alternatively or additionally, a check can be made for example as to whether the state data of the other object 45 that can be extracted from the environment data agree with the state data received as part of the configuration data. If the state data agree, then the respective relative position of the other object 45 can be selected as the relative position of the other vehicle 30.

In the environment data, in particular a picture of the other vehicle 30 can be recognized. For example, in the environment data a picture of the other vehicle 30 is searched for or recognized. In particular, the picture of the other vehicle is recognized in the environment data by recognizing characteristic features in the environment data, for example body shape or color, which are received as part of the vehicle data with the configuration data 32. A relative position of another object, which is represented by the picture, can be determined by the environment sensor system 20 as the relative position of the other vehicle 30.

Calculations and analyses for determining the relative position of the other vehicle 30 are in particular carried out by the determination unit 18.

Similarly to the configuration data 32 of the other vehicle 30, other configuration data 42 can be received from the further other vehicles 40 or from the communication devices 41 thereof. A respective relative position of the further other vehicles 40 relative to the motor vehicle 1 can be determined similarly to the relative position of the other vehicle 30.

The user 2 of the motor vehicle 1 is provided with a virtual display 4 indicating the other vehicle 30 as a possible communication partner by the display unit 14. The further other vehicles 40 can also be indicated as possible communication partners by using the virtual display 4 in an optional way. The virtual display 4 is at least partly provided using the relative position of the other vehicle 30 and the configuration data 32 of the other vehicle 30. The virtual display 4 can be at least partly provided in an optional way using the respective relative positions of the further other vehicles 40 and/or using the other communication data 42 of the further other vehicles 40. According to FIG. 2 the virtual display 4 can display to the user 2 the vehicle 1 and/or the other vehicle 30 and/or the further other vehicles 40 for example from a perspective view, from a map view or from a bird's-eye view. Alternatively, the virtual display 4 can be provided on a text basis, wherein the other vehicle 30 and/or the further other vehicles 40 are characterized or represented by position information, such as for example "front", "rear" or "right".

By using the virtual display 4 it can be displayed to the user 2 that the other vehicle 30 and/or the further other vehicles 40 include a communication device for establishing the communication connection 19 and/or for the establishment of the communication connection 19 by the motor vehicle 1. Advantageously, the virtual display 4 is represented in the form of an expanded reality, also known as an augmented reality. In this case, by the projection 17 the other vehicle 30 and/or the further other vehicles 40 can be overlaid by and/or characterized with a symbol or a color. For example, other vehicles that include a communication device for establishing the communication connection 19 are shown in green and other vehicles with no communication device for establishing the communication connection 19 are shown in red.

A communication command from the user 2 is received by using the input device 15, wherein the other vehicle 30 and/or one or more of the further other vehicles 40 are selected as the communication partner or as one of the communication partners by the communication command. For example, the user 2 taps the touch-sensitive display screen forming the display unit 14 and the input device 15 on the other vehicles 30, 40, i.e. the other vehicle 30 and/or one or more of the further other vehicles 40, with which he wishes to establish the direct communication connection 19. The communication command can be referred to as a "call up". Alternatively or additionally, the user 2 can point to the other vehicles 30, 40 with which he wishes to establish the direct communications connection 19. The pointing by the user 2 can be received as a communication command by a sensor system 21 for gesture recognition, for example a camera in the interior of the motor vehicle 1. For example, the user 2 points in the virtual display 4 provided by the projection 17 to the picture of the wanted other vehicle 30, 40 in the virtual display 4. Particularly advantageously, the user 2 points directly at the real other vehicle 30, 40 that is to be selected as a communication partner.

The direct communication connection 19 is established with the communication partner by the sending unit 13. For example, the direct communication connection 19 between the motor vehicle 1 and the communication partner, for example the other vehicle 30, is established by using Bluetooth or by using WLAN. The range of the communication connection 19 can be limited to a few tens of m, for example 10 m, 20 m, 30 m, 40 m or 50 m in this case, because a communication is only to be carried out with a neighboring vehicle or a very close neighboring vehicle. The initiation and the operation of the communication connection 19 is carried out in particular by using common protocol mechanisms known from the related art. In this case, in addition to a purely voice connection, in particular voice data or voice messages, other data can be transmitted, for example image data, documents, in particular text documents, emails or short messages. The image data can for example be image data from a driver observation camera or images provided by a mobile telephone coupled to the motor vehicle 1. If a plurality of the other vehicles 30, 40 are selected as communication partners, then a local conference circuit or conference connection can be established. In this case, in particular the motor vehicle 1 can act as the host, which distributes the communication data to be transmitted between the different communication partners. If the communication connection 19 is established because of the communication command from the user 2, it can be visibly and/or audibly signaled to the communication partner, i.e. for example the other vehicle 30 or another user, in particular the other vehicle 30, that an incoming communication connection 19 is to be established. In particular, the permission of the other user for this can be requested. In particular, the other vehicle 30 and/or the further other vehicles 40 also include(s) a communication device similar to the communication device 5 of the motor vehicle 1. It can be indicated to the other user of the communication partner, for example the other vehicle 30, which vehicle in the surroundings U wants to establish the communication connection or wants to open a conversation. Alternatively or additionally, the direction in which the motor vehicle 1 that wants to open the conversation is located in the surroundings U can be indicated. In particular, the conversation or the direct communication connection 19 can be established following a confirmation by the other driver.

Overall, the exemplary embodiments show how the communication connection 19 of the motor vehicle 1 with the other vehicle 30 for example can be established. In particular, the other vehicle 30 can be any vehicle in the surroundings U of the motor vehicle 1 that is not known to the user 2 at first.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for establishing a communication connection of a motor vehicle with an other vehicle located in a vicinity of the motor vehicle, the method comprising:
    receiving configuration data from the other vehicle;
    determining a relative position of the other vehicle relative to the motor vehicle using environment data acquired by an environment sensor system of the motor vehicle and the received configuration data by:
        recognizing, using the environment data, an image of the other vehicle using vehicle data at least characterizing an appearance of the other vehicle and forming part of the configuration data, or
        determining, using the environment data and a receiving direction from which the configuration data is received, a respective relative position of a plurality of objects in the vicinity of the motor vehicle as potential relative positions of the other vehicle and selecting the relative position of the other vehicle from the potential relative positions using the receiving direction from which the configuration data are received;
    providing a virtual display for a user of the motor vehicle indicating the other vehicle as a possible communication partner, at least partly using the relative position of the other vehicle and the configuration data;
    receiving a communication command from the user by which the other vehicle is selected as a communication partner; and
    establishing a direct communication connection with the other vehicle selected as the communication partner.

2. The method as claimed in claim 1, wherein at least one of image data, text messages, or audio data are transmitted and/or received via the communication connection.

3. The method as claimed in claim 1, the determining the relative position of the other vehicle includes trilateration using a radio signal for receiving the configuration data.

4. The method as claimed in claim 3, further comprising receiving the radio signal using a receiver and at least one other receiver and by analyzing at least one of a respective amplitude, phase, or transition time of the radio signal at the receiver and the at least one other receiver.

5. The method as claimed in claim 1, wherein the configuration data further includes state data of the other vehicle.

6. The method as claimed in claim 1, further comprising determining the relative position of the other vehicle using the environment data with reference to state data of the other vehicle.

7. The method as claimed in claim 1, wherein the selecting the relative position of the other vehicle from the potential relative positions further includes using the configuration data.

8. The method as claimed in claim 1, further comprising:
    receiving respective configuration data from further other vehicles;
    determining a respective relative position for the further other vehicles;
    providing the virtual display for the user of the motor vehicle indicating the other vehicle and the further other vehicles; and
    receiving the communication command from the user by which the other vehicle and one or more of the further other vehicles are selected as communication partners.

9. The method as claimed in claim 8, further comprising establishing a conference connection with the communication partners.

10. A motor vehicle, comprising:
    a chassis; and
    a communication device configured to establish a communication connection of the motor vehicle with an other vehicle located in a vicinity of the motor vehicle, the communication device including:
        a receiver configured to receive configuration data from the other vehicle,
        a processor configured to determine a relative position of the other vehicle relative to the motor vehicle,
        a display configured to provide a virtual display for a user of the motor vehicle indicating the other vehicle as a possible communication partner, at least partly using the relative position of the other vehicle and the configuration data,
        an input device configured to receive a communication command from the user by which the other vehicle is selected as the communication partner,
        a transmitter configured to establish a direct communication connection with the other vehicle when the other vehicle is selected as the communication partner, and
        an environment sensor system configured to acquire environment data, wherein to determine the relative position of the other vehicle relative to the motor vehicle using the environment data acquired by the environment sensor system, the processor is further configured:
- to recognize, using the environment data, an image of the other vehicle in the environment data using vehicle data at least characterizing an appearance of the other vehicle and forming part of the configuration data, or
- to determine, using the environment data and a receiving direction from which the configuration data is received, a respective relative position of a plurality of other objects in the vicinity of the motor vehicle as potential relative positions of the other vehicle, the relative position of the other vehicle being selected from the potential relative positions using the receiving direction from which the configuration data are received.

11. The motor vehicle as claimed in claim 10, wherein at least one of image data, text messages, or audio data are sent and/or received via the communication connection.

12. The motor vehicle as claimed in claim 10, wherein the processor is configured to determine the relative position of the other vehicle by trilateration using a radio signal for receiving the configuration data.

13. The motor vehicle as claimed in claim 12, wherein the communication device further includes at least one other receiver, and the processor is configured to determine the relative position of the other vehicle by receiving the radio signal using the receiver and the at least one other receiver and by analyzing at least one of a respective amplitude, phase, or transition time of the radio signal at the receiver and the at least one other receiver.

14. The motor vehicle as claimed in claim 10, wherein the configuration data further includes state data of the other vehicle.

15. The motor vehicle as claimed in claim 10, wherein the processor is configured to determine the relative position of the other vehicle using the environment data with reference to state data of the other vehicle.

16. The motor vehicle as claimed in claim 10, wherein the processor is further configured to determine the relative position of the other vehicle from the potential relative positions using the configuration data.

17. The motor vehicle as claimed in claim 10, wherein
the receiver is further configured to receive respective configuration data from further other vehicles,
the processor is further configured to determine a respective relative position for the further other vehicles,
the display is further configured to provide the virtual display for the user of the motor vehicle indicating the other vehicle and the further other vehicles, and
the input device is further configured to receive the communication command from the user by which the other vehicle and one or more of the further other vehicles are selected as communication partners.

18. The motor vehicle as claimed in claim 17, wherein the transmitter is further configured to establish a conference connection with the communication partners.

* * * * *

UNITED STATES PATENT AND TRADEMARK OFFICE
CERTIFICATE OF CORRECTION

PATENT NO. : 11,525,882 B2
APPLICATION NO. : 16/467836
DATED : December 13, 2022
INVENTOR(S) : Manfred Holzmann It is certified that error appears in the above-identified patent and that said Letters Patent is hereby corrected as shown below:

On the Title Page

Item (54), Column 1, Lines 1-4, delete "ESTABLISHING A DIRECT COMMUNICATION LINK WITH ANOTHER VEHICLE IN THE VICINITY OF A MOTOR VEHICLE" and insert --ESTABLISHING A DIRECT COMMUNICATION CONNECTION LINK WITH AN OTHER VEHICLE IN THE VICINITY OF A MOTOR VEHICLE--.

In the Specification

Title, Column 1, Lines 1-4, delete "ESTABLISHING A DIRECT COMMUNICATION LINK WITH ANOTHER VEHICLE IN THE VICINITY OF A MOTOR VEHICLE" and insert --ESTABLISHING A DIRECT COMMUNICATION CONNECTION LINK WITH AN OTHER VEHICLE IN THE VICINITY OF A MOTOR VEHICLE--.

In the Claims

Column 13, Line 13, In Claim 10, before "objects" delete "other".

Signed and Sealed this
Fourteenth Day of February, 2023

Katherine Kelly Vidal
*Director of the United States Patent and Trademark Office*